(12) United States Patent
Hanjagi et al.

(10) Patent No.: US 9,587,603 B2
(45) Date of Patent: Mar. 7, 2017

(54) COMPACT FUEL PRESSURE REGULATOR

(75) Inventors: Mahesh N. Hanjagi, Yorktown, VA (US); Stephen C. Bugos, Poquoson, VA (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 1036 days.

(21) Appl. No.: 13/223,963

(22) Filed: Sep. 1, 2011

(65) Prior Publication Data

US 2013/0056098 A1 Mar. 7, 2013

(51) Int. Cl.
*F16K 15/02* (2006.01)
*F02M 37/00* (2006.01)

(52) U.S. Cl.
CPC ....... *F02M 37/0029* (2013.01); *F16K 15/026* (2013.01); *Y10T 137/7922* (2015.04)

(58) Field of Classification Search
CPC .. F16K 15/021; F16K 15/026; F02M 37/0029
USPC ...... 137/540, 543.23, 539, 543.21; 251/337; 123/506
See application file for complete search history.

(56) References Cited

U.S. PATENT DOCUMENTS

| | | | |
|---|---|---|---|
| 2,481,482 A | 9/1949 | Green | |
| 2,697,915 A * | 12/1954 | Chisholm | 137/543.21 |
| 3,035,601 A * | 5/1962 | Moseley | 137/266 |
| 3,036,594 A * | 5/1962 | Salisbury | 137/543.19 |
| 3,580,275 A * | 5/1971 | Hanson et al. | 137/540 |
| 3,830,255 A * | 8/1974 | Freiheit | 137/539 |
| 4,212,316 A | 7/1980 | Basch | |
| 5,183,075 A * | 2/1993 | Stein | 137/539 |
| 5,623,910 A * | 4/1997 | Riggle | 123/510 |
| 5,794,657 A * | 8/1998 | Oberg | 137/543.21 |
| 5,918,628 A * | 7/1999 | Harding | 137/512.1 |
| 6,293,259 B1 * | 9/2001 | Kilgore et al. | 137/539 |
| 6,668,856 B2 * | 12/2003 | Warlick | 137/539 |
| 6,792,918 B1 * | 9/2004 | Halsall | 123/506 |

(Continued)

FOREIGN PATENT DOCUMENTS

| | | |
|---|---|---|
| DE | 19614446 C1 | 1/1998 |
| DE | 10036939 A1 | 2/2002 |

(Continued)

OTHER PUBLICATIONS

The International Search Report and The written Opinion of the International Searching Authority, PCT/US2012/052736.
English translation of China Office Action dated Nov. 4, 2015.

*Primary Examiner* — Kevin Murphy

(57) ABSTRACT

A compact fuel pressure regulator (10) includes a housing (12) with an interior (13) communicating and inlet opening (16) and an outlet opening (20). The housing defines a valve seat surface (26) in the interior. A cover (22) is provided at an end of the housing and is disposed in the interior. The cover includes a through-hole (24) therein that communicates the outlet opening with the interior. A valve structure (28) is movable within the interior to control fuel flow between the inlet opening and outlet opening. A spring (30) is engaged between the valve structure and the cover so that when pressure of fuel at the inlet opening is greater than a force of the spring, the fuel pushes the valve structure against the bias of the spring and away from the valve seat surface so that fuel flows around a periphery of the valve structure to the outlet opening.

17 Claims, 1 Drawing Sheet

(56) References Cited

U.S. PATENT DOCUMENTS

| | | | |
|---|---|---|---|
| 6,971,405 B2* | 12/2005 | Pickelman | 137/540 |
| 7,287,546 B2* | 10/2007 | Konishi | 137/539 |
| 7,581,560 B2* | 9/2009 | Koch et al. | 137/543.21 |
| 2004/0007271 A1* | 1/2004 | Kuehn et al. | 137/539 |
| 2004/0069352 A1* | 4/2004 | Wieland et al. | 137/539 |
| 2005/0061372 A1* | 3/2005 | McGrath et al. | 137/539.5 |
| 2006/0108005 A1* | 5/2006 | Bennet et al. | 137/539 |
| 2008/0047621 A1* | 2/2008 | Ittlinger et al. | 137/539 |
| 2011/0186152 A1* | 8/2011 | Herrera | 137/535 |
| 2011/0315909 A1 | 12/2011 | Oikawa | |

FOREIGN PATENT DOCUMENTS

| | | | |
|---|---|---|---|
| FR | 2225674 A1 | 11/1974 | |
| WO | 0181803 A1 | 11/2001 | |

\* cited by examiner

COMPACT FUEL PRESSURE REGULATOR

FIELD OF THE INVENTION

The invention relates to fuel systems of internal combustion engines for vehicles and, more particularly, a fuel pressure regulator of compact configuration and having a reduced number of components.

BACKGROUND OF THE INVENTION

Almost all fuel delivery systems for vehicles, both return and returnless, use a fuel pressure regulator at some interface in the system. Contemporary fuel pressure regulators require dedicated real-estate to be assembled in the system. This space requirement complicates the system configuration by making the system less flexible. Also, because of the size and the number of components involved, the conventional fuel pressure regulators are expensive.

Thus, there is a need for a compact, high-performance and cost-effective fuel pressure regulator.

SUMMARY OF THE INVENTION

An object of the invention is to fulfill the need referred to above. In accordance with the principles of the present invention, this objective is obtained by providing a fuel pressure regulator for a fuel delivery system of an internal combustion engine. The pressure regulator includes a housing having an interior communicating with first and second opposing ends. The first end includes an inlet opening and the second end includes at least one outlet opening so that fuel can enter the inlet opening, move through the interior and exit from the outlet opening in a single direction. The housing defines a valve seat surface in the interior. A cover is provided at the second end and is disposed in the interior of the housing. The cover includes at least one through-hole therein that communicates the outlet opening with the interior of the housing. A valve structure is movable within the interior to control fuel flow between the inlet opening and outlet opening. A spring is engaged between the valve structure and the cover. The valve structure and spring are constructed and arranged so that when the pressure of fuel at the inlet opening is greater than a force exerted by the spring, the fuel pushes the valve structure against the bias of the spring and away from sealed engagement with the valve seat surface so that fuel flows around a periphery of the valve structure to the outlet opening, until the force of the spring is greater than the pressure of the fuel, with the spring returning the valve structure to sealed engagement with the seat surface, closing the inlet opening.

In accordance with another aspect of a disclosed embodiment, a fuel pressure regulator for a fuel delivery system of an internal combustion engine includes a housing having an interior communicating with first and second opposing ends. The first end includes an inlet opening and the second end includes at least one outlet opening so that fuel can enter the inlet opening, move through the interior, and exit from the outlet opening in a single direction. The housing defines a valve seat surface in the interior. Means is provided for covering the second end. The means for covering includes at least one through-hole therein that communicates the outlet opening with the interior of the housing. Means, movable within the interior, is provided for controlling fuel flow between the inlet opening and outlet opening. Means is provided for biasing the means for controlling. The means for biasing being engaged between the means for controlling and the means for covering. The means for controlling and the means for biasing are constructed and arranged so that when the pressure of fuel at the inlet opening is greater than a force exerted by the means for biasing, the fuel pushes the means for controlling against the bias of the means for biasing and away from sealed engagement with the valve seat surface so that fuel flows around a periphery of the means for controlling to the outlet opening, until the force of the means for biasing is greater than the pressure of the fuel, with the means for biasing returning the means for controlling to sealed engagement with the seat surface, closing the inlet opening.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENTS

Figure 1:
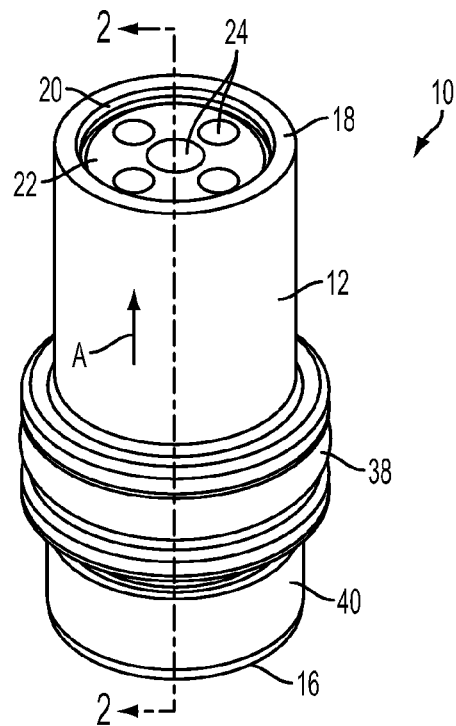
FIG. 1 is a view of a compact fuel pressure regulator provided in accordance with and embodiment of the invention.
Figure 2:
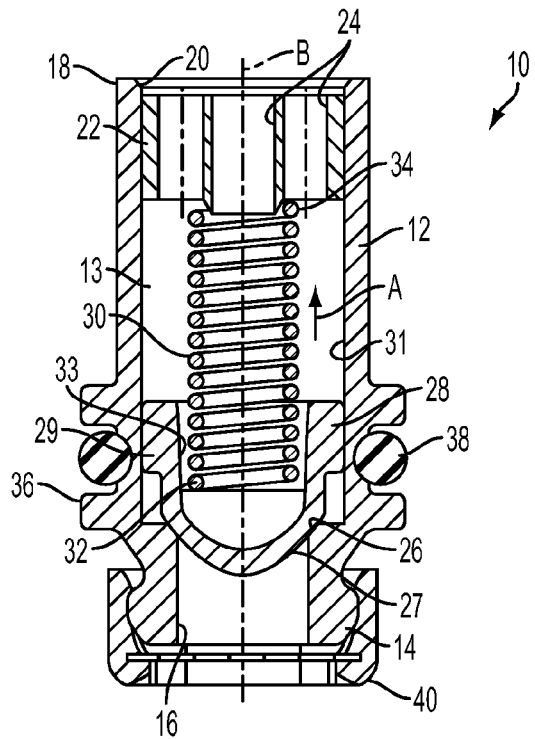
FIG. 2 is a cross-sectional view of the fuel pressure regulator taken along the line 2-2 of FIG. 1.

With reference to FIGS. 1 and 2, a compact fuel pressure regulator is shown, generally indicated at 10, in accordance with an embodiment of the invention. The pressure regulator 10 is constructed and arranged for use in a fuel delivery system of an internal combustion. The pressure regulator 10 includes a small housing 12 in the form of a generally cylindrical tube having an interior 13. At one end 14, the housing 12 has an opening 16 of a particular shape that defines a fuel inlet of the pressure regulator 10. The opposing end 18 of the housing 12 includes an opening 20 that defines a fuel outlet of the pressure regulator 10. Openings 16 and 20 communicate with the interior 13 so that the pressure regulator 10 has a flow-through configuration so that fuel can enter the inlet opening 16, move through the interior 13 and exit from the outlet openings 20 in a single direction (e.g., direction of arrow A).

A generally cylindrical cover 22 is provided at the outlet end 18 of the housing 12 and disposed entirely in the interior 13 thereof. The cover 22 includes at least one through-hole 24 therein that communicates the outlet opening 20 with the interior 13. Both the housing 12 and the cover 22 together define the structural form of the pressure regulator 10 and also are the means for interfacing with a fuel delivery system (not shown).

Near the inlet end 14, the housing 12, in the interior 13 thereof, defines a valve seat surface 26 for engaging a valve structure 28. The valve structure 28 is disposed for movement within the interior 13 of the housing 12 to control fuel flow from the inlet opening 16 to the outlet opening 20. A generally conical surface 27 of the valve structure 28 engages the seat surface 26 to close the inlet opening 16. The valve structure 28 is generally cup-shaped having a cylindrical periphery 29 generally adjacent to an inner cylindrical wall 31 of the housing 12 to permit fuel to pass therebetween. The seat surface 26 is integral with the housing 12 and is closer to a central axis B than the inner cylindrical wall 31.

The regulator 10 includes a spring 30, defining biasing means, disposed in the interior 13 of the housing 12. One end 32 of the spring 30 is engaged within a cup portion 33 of the valve structure 28 and the other end 34 of the spring 30 is engaged with the cover 22. The spring 30 is preferably a variable rate compression spring which also contributes in regulating the fuel flow through the regulator 10. Thus, in operation, when the pressure of the inlet fuel is greater than the force exerted by the spring 30, the fuel pushes the valve structure 28 in an axial upward direction (arrow A) against the bias of the spring 30, and the conical surface 27 of the valve structure 28 disengages from its sealed relation with the seat surface 26. Fuel flows around the periphery 29 of the valve structure 28, through the flow-through pressure regulator 10 to the outlet openings until the force of the spring 30 is greater than the pressure of the fuel, with the spring 30 returning the valve structure 28 to sealed engagement with the seat surface 26, thus closing the opening 16. Thus, the valve structure 28, is a multi-functional component since it not only is part of the sealing assembly which acts as a pressure balance point, but also allows a variable size fuel flow path through the regulator 10. The variable size fuel flow path occurs since, as the conical surface 27 of the valve structure 28 moves away from the seat surface 26, the fluid opening between the valve structure 28 and the seat surface 26 becomes larger.

The housing 12 also has external features such as a groove 36 to capture an O-ring 38. The O-ring 38 is instrumental in sealingly securing the fuel pressure regulator within the external system. A filter 40 is preferably coupled to the inlet end 14 of the housing 12 for filtering fuel prior to entering the housing 12.

The pressure regulator 10 revolutionizes the way a conventional pressure regulator is conceived and operated. The pressure regulator 10 eliminates the use of a rubber diaphragm and all the components associated with the diaphragm assembly. It also reduces the number of components used in a regulator. The engineered flow-path and the radically small configuration sets the pressure regulator 10 apart from the conventional, bulky and expensive configurations. The valve structure 28 has a unique configuration and combines three to four parts of a conventional fuel pressure regulator into a single component. The assembly of the regulator 10 is very efficient involving few steps. The fuel pressure regulator 10 is at most ⅓ the size of a conventional regulator.

The pressure regulator 10 can be used in a fuel system (fuel rail, fuel filter and fuel pump module) for an internal combustion engine system. It can also be used in a Direct Injection System for two and three wheel applications as well as off-road and other non-automotive applications like pleasure crafts, ATV's and utility vehicles.

The compact pressure regulator 10 provides equivalent or better functional performance as compared to conventional regulators while using almost half the number of components as a conventional regulator, thus making the regular cost-effective.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A fuel pressure regulator for a fuel delivery system of an internal combustion engine, the pressure regulator comprising:
   a unitary housing having a wall defining an interior communicating with first and second opposing ends, the first end including an inlet opening, and the second end including at least one outlet opening so that fuel can enter the inlet opening, move through the interior and exit from the outlet opening in a single direction, the housing defining an integral valve seat surface in the interior,
   a generally cylindrical cover provided at the second end and disposed entirely within the interior of the housing, the cover including at least one hole extending longitudinally through the cover that communicates the outlet opening with the interior of the housing,
   a valve structure, movable adjacent to the wall and within the interior, to control fuel flow between the inlet opening and outlet opening, a first end of the valve structure defining a cup portion having an interior space, the valve structure having a generally conical surface that is constructed and arranged to engage the valve seat surface to close the inlet opening, and
   a spring disposed at least partially in the interior space of the cup portion and engaged between the valve structure and the cover so as to force the valve structure to close the inlet opening,
   wherein the valve structure and spring are constructed and arranged so that when the pressure of fuel at the inlet opening is greater than the force exerted by the spring, the fuel pushes the valve structure against the bias of the spring and away from sealed engagement with the valve seat surface so that fuel flows solely around and past a periphery of the valve structure between the valve structure and the wall to the outlet opening without flowing through the interior space of the cup portion, until the force of the spring is greater than the pressure of the fuel, with the spring returning the valve structure to sealed engagement with the seat surface, closing the inlet opening.

2. The regulator of claim 1, wherein the spring is a variable rate compression spring.

3. The regulator of claim 1, further comprising a filter coupled to the first end of the housing and constructed and arranged to filter fuel prior to entering the housing.

4. The regulator of claim 1, wherein the housing is generally cylindrical tube having an inner cylindrical wall.

5. The regulator of claim 4, wherein the valve structure is a unitary member including at the first end, a cylindrical periphery generally adjacent to the inner cylindrical wall of the housing and at a second end, a surface that engages the valve seat to close the inlet opening.

6. The regulator of claim 4, wherein the valve seat surface is closer to a central axis of the regulator than is the inner cylindrical wall of the housing.

7. The regulator of claim 1, wherein the cover includes a plurality of holes extending longitudinally through the cover.

8. The regulator of claim 1, wherein the housing includes a groove in a periphery thereof, and the regulator further comprises an O-ring in the groove.

9. A fuel pressure regulator for a fuel delivery system of an internal combustion engine, the pressure regulator comprising:
- a unitary housing having a wall defining an interior communicating with first and second opposing ends, the first end including an inlet opening, and the second end including at least one outlet opening so that fuel can enter the inlet opening, move through the interior and exit from the outlet opening in a single direction, the housing defining an integral valve seat surface in the interior,
- means for covering the second end and disposed entirely within the interior of the housing, the means for covering including at least one hole extending longitudinally through the means for covering that communicates the outlet opening with the interior of the housing,
- means, adjacent to the wall and movable within the interior, for controlling fuel flow between the inlet opening and outlet opening, a first end of the means for controlling defining a cup portion having an interior space, the means for controlling having a generally conical surface that is constructed and arranged to engage the valve seat surface to close the inlet opening, and
- means for biasing the means for controlling, the means for biasing being disposed at least partially in the interior space of the cup portion and being engaged between the means for controlling and the means for covering so as to force the means for controlling to close the inlet opening,
- wherein the means for controlling and the means for biasing are constructed and arranged so that when the pressure of fuel at the inlet opening is greater than the force exerted by the means for biasing, the fuel pushes the means for controlling against the bias of the means for biasing and away from sealed engagement with the valve seat surface so that fuel flows solely around and past a periphery of the means for controlling between the means for controlling and the wall to the outlet opening without flowing through the interior space of the cup portion, until the force of the means for biasing is greater than the pressure of the fuel, with the means for biasing returning the means for controlling to sealed engagement with the seat surface, closing the inlet opening.

10. The regulator of claim 9, wherein the means for biasing is a variable rate compression spring.

11. The regulator of claim 9, further comprising a filter coupled to the first end of the housing and constructed and arranged to filter fuel prior to entering the housing.

12. The regulator of claim 9, wherein the housing is generally cylindrical tube having an inner cylindrical wall.

13. The regulator of claim 12, wherein the means for controlling is a unitary valve structure having at the first end, a cylindrical periphery generally adjacent to the inner cylindrical wall of the housing and at a second end, a surface that engages the valve seat to close the inlet opening.

14. The regulator of claim 12, wherein the valve seat surface is closer to a central axis of the regulator than is the inner cylindrical wall of the housing.

15. The regulator of claim 9, wherein the means for controlling is a valve structure.

16. The regulator of claim 9, wherein the means for covering is a generally cylindrical member having a plurality of holes extending longitudinally through the cover.

17. The regulator of claim 9, wherein the housing includes a groove in a periphery thereof, and the regulator further comprises an O-ring in the groove.

* * * * *